(12) United States Patent
Guo

(10) Patent No.: US 12,213,122 B2
(45) Date of Patent: Jan. 28, 2025

(54) METHOD AND APPARATUS FOR BEAM MANAGEMENT, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 469 days.

(21) Appl. No.: 17/523,716

(22) Filed: Nov. 10, 2021

(65) Prior Publication Data

US 2022/0070853 A1    Mar. 3, 2022

Related U.S. Application Data

(63) Continuation of application No. PCT/CN2020/110772, filed on Aug. 24, 2020.

(Continued)

(51) Int. Cl.
*H04W 72/044* (2023.01)
*H04B 17/336* (2015.01)
(Continued)

(52) U.S. Cl.
CPC ........ *H04W 72/046* (2013.01); *H04B 17/336* (2015.01); *H04W 72/02* (2013.01); *H04W 72/1268* (2013.01)

(58) Field of Classification Search
CPC .. H04B 17/336; H04B 7/0695; H04B 7/0617; H04B 7/0628; H04L 5/001;
(Continued)

(56) References Cited

U.S. PATENT DOCUMENTS 11,678,174 B2 * 6/2023 Matsumura ............. H04W 8/24
370/329
2019/0159100 A1 * 5/2019 Liou ...................... H04B 7/088
(Continued)

FOREIGN PATENT DOCUMENTS

| CN | 106685505 A | 5/2017 |
| CN | 108513737 A | 9/2018 |
| WO | 2019135654 A1 | 7/2019 |

OTHER PUBLICATIONS

Qualcomm Incorporated, "Enhancements on Multi-beam Operation", 3GPP TSG-RAN WG1 Meeting #97 R1-1907290, May 17, 2019(May 17, 2019).

(Continued)

*Primary Examiner* — Rownak Islam
(74) *Attorney, Agent, or Firm* — PERKINS COIE LLP

(57) ABSTRACT

A method and apparatus for beam management and a non-transitory computer-readable storage medium are provided. The method includes that: UE sends a MAC CE message for BFRQ to a first SCell, the MAC CE message being carried in a first PUSCH at slot n, and the first PUSCH corresponding to a first HARQ process number; the UE monitors a first DCI in a first time window, the first DCI being used for scheduling the first PUSCH corresponding to the first HARQ process number; and in response to not receiving the first DCI within the first time window, the UE determines that beam failure recovery for the first SCell is completed.

11 Claims, 3 Drawing Sheets

Related U.S. Application Data

(60) Provisional application No. 62/902,878, filed on Sep. 19, 2019.

(51) Int. Cl.
  *H04W 72/02* (2009.01)
  *H04W 72/1268* (2023.01)

(58) Field of Classification Search
  CPC ..... H04L 5/0023; H04L 5/005; H04L 5/0051; H04W 72/046; H04W 72/02; H04W 72/1268; H04W 24/04; H04W 56/00; H04W 72/23
  USPC .......................................................... 370/252
  See application file for complete search history.

(56) References Cited

U.S. PATENT DOCUMENTS

| | | | | |
|---|---|---|---|---|
| 2020/0267048 | A1* | 8/2020 | Yu | H04B 7/0695 |
| 2021/0344405 | A1* | 11/2021 | Yuan | H04W 76/19 |
| 2021/0345141 | A1* | 11/2021 | Cao | H04W 24/10 |
| 2022/0140960 | A1* | 5/2022 | Gao | H04L 5/0048 370/336 |
| 2022/0231741 | A1* | 7/2022 | Xiao | H04B 7/0626 |

OTHER PUBLICATIONS

Huawei et al., "Discussion on BFR-config for SCell BFR", 3GPP TSG-RAN WG2 Meeting 102 R2-1807961, May 25, 2018(May 25, 2018).

International Search Report in the international application No. PCT/CN2020/110772, mailed on Dec. 1, 2020.

Written Opinion of the International Search Authority in the international application No. PCT/CN2020/110772, mailed on Dec. 1, 2020.

3rd Generation Partnership Project; Technical Specification Group Radio Access Network; NR; Physical channels and modulation(Release 15), 3GPP TS 38.211 V15.5.0 (Mar. 2019).

3rd Generation Partnership Project; Technical Specification Group Radio Access Network; NR; Multiplexing and channel coding(Release 15), 3GPP TS 38.212 V15.5.0 (Mar. 2019).

3rd Generation Partnership Project; Technical Specification Group Radio Access Network; NR; Physical layer procedures for control(Release 15), 3GPP TS 38.213 V15.5.0 (Mar. 2019).

3rd Generation Partnership Project; Technical Specification Group Radio Access Network; NR; Physical layer procedures for data(Release 15), 3GPP TS 38.214 V15.5.0 (Mar. 2019).

3rd Generation Partnership Project; Technical Specification Group Radio Access Network; NR; Physical layer measurements(Release 15), 3GPP TS 38.215 V15.5.0 (Jun. 2019).

3rd Generation Partnership Project; Technical Specification Group Radio Access Network; NR; Medium Access Control (MAC) protocol specification(Release 15), 3GPP TS 38.321 V15.5.0 (Mar. 2019).

3rd Generation Partnership Project; Technical Specification Group Radio Access Network; NR; Radio Resource Control (RRC) protocol specification(Release 15), 3GPP TS 38.331 V15.5.0 (Mar. 2019). (Part 1 of 6—pp. 1-90).

3rd Generation Partnership Project; Technical Specification Group Radio Access Network; NR; Radio Resource Control (RRC) protocol specification(Release 15), 3GPP TS 38.331 V15.5.0 (Mar. 2019). (Part 2 of 6—pp. 91-180).

3rd Generation Partnership Project; Technical Specification Group Radio Access Network; NR; Radio Resource Control (RRC) protocol specification(Release 15), 3GPP TS 38.331 V15.5.0 (Mar. 2019). (Part 3 of 6—pp. 181-240).

3rd Generation Partnership Project; Technical Specification Group Radio Access Network; NR; Radio Resource Control (RRC) protocol specification(Release 15), 3GPP TS 38.331 V15.5.0 (Mar. 2019). (Part 4 of 6—pp. 241-311).

3rd Generation Partnership Project; Technical Specification Group Radio Access Network; NR; Radio Resource Control (RRC) protocol specification(Release 15), 3GPP TS 38.331 V15.5.0 (Mar. 2019). (Part 5 of 6—pp. 312-401).

3rd Generation Partnership Project; Technical Specification Group Radio Access Network; NR; Radio Resource Control (RRC) protocol specification(Release 15), 3GPP TS 38.331 V15.5.0 (Mar. 2019). (Part 6 of 6—pp. 402-489).

Office Action of the Indian application No. 202117050326, issued on Apr. 28, 2022. 6 pages with English translation.

Samsung "Enhancements on MIMO for NR" 3GPP Draft; RP-191953; 3GPP TSG RAN Meeting #85; Newport Beach, USA; Sep. 16-20, 2019. 18 pages.

Supplementary European Search Report in the European application No. 20865280.0, mailed on May 16, 2022. 7 pages.

Ericsson, "Enhancements to multibeam operation", 3GPP TSG-RAN WG1 Meeting #98 Tdoc R1-1909225, Prague, Czech Republic, Aug. 26-30, pp. 1-20.

Asia Pacific Telecom, "Discussion on Multi-beam Operations", 3GPP TSG-RAN WG1 Meeting #98 R1-1908928, Prague, CZ, Aug. 26-30, 2019, pp. 1-7.

Vivo, "Further discussion on Multi-Beam Operation", 3GPP TSG RAN WG1 #98 R1-1908167, Prague, CZ, Aug. 26-30, 2019, pp. 1-12.

Apple Inc, "Feature lead summary on L1-SINR and SCell BFR", 3GPP TSG RAN WG1 #98 R1-1909482, Prague, Czech Republic, Aug. 26-30, 2019, pp. 1-24.

First Office Action of the Japanese application No. 2021-571797, issued on Jun. 14, 2024. 8 pages with English translation.

\* cited by examiner

In the case that a UE is not configured with candidate new beam RSs for a first SCell, the UE determines CSI-RS resources and/or SSBs in a target cell as the candidate new beam RSs for the first SCell, the candidate new beam RSs are used for a beam failure recovery for the first SCell, and the first SCell is in a same frequency band as the target cell. —201

METHOD AND APPARATUS FOR BEAM MANAGEMENT, AND COMPUTER-READABLE STORAGE MEDIUM

CROSS-REFERENCE TO RELATED APPLICATIONS

This is a continuation application of International Patent Application No. PCT/CN2020/110772, filed on Aug. 24, 2020, which claims priority to U.S. Patent Application No. 62/902,878, filed on Sep. 19, 2019, the entire contents of which are incorporated herein by reference.

BACKGROUND

For a Beam Failure Recovery (BFR) of a Secondary cell (SCell), User Equipment (UE) behavior is not clear when candidate new beam Reference Signals (RSs) are not configured. Forcing a Network (NW) to configure candidate new beam RSs (that can be up to 64 RSs) for every SCell would increase an overhead of a Radio Resource Control (RRC) signaling.

SUMMARY

The disclosure relates to the technical field of mobile communications, and in particular to a method and apparatus for beam management, and a non-transitory computer-readable storage medium.

The embodiment of the disclosure provides a method for beam management, which includes the following operations.

UE sends a Media Access Control (MAC) Control Element (CE) message for Beam Failure Recovery reQuest (BFRQ) to a first SCell. The MAC CE message is carried in a first Physical Uplink Shared Channel (PUSCH) at slot n, and the first PUSCH corresponds to a first Hybrid Automatic Repeat reQuest (HARQ) process number. The UE monitors a first Downlink Control Information (DCI) in a first time window. The first DCI is used for scheduling the first PUSCH corresponding to the first HARQ process number. In response to not receiving the first DCI within the first time window, the UE determines that beam failure recovery for the first SCell is completed.

The embodiment of the disclosure provides an apparatus for beam management, which includes a transceiver, a processor, and a memory for storing a computer program. The processor is configured to execute the computer program stored in the memory to: control the transceiver to send a MAC CE message for BFRQ to a first SCell, the MAC CE message being carried in a first PUSCH at slot n, and the first PUSCH corresponding to a first HARQ process number; control the transceiver to monitor a first DCI in a first time window, the first DCI being used for scheduling the first PUSCH corresponding to the first HARQ process number; and in response to not receiving the first DCI within the first time window, determine that beam failure recovery for the first SCell is completed.

The embodiment of the disclosure provides a non-transitory computer-readable storage medium having stored thereon a computer program which, when being executed by a computer, causes the computer to perform a method for beam management. The method includes: sending a MAC CE message for BFRQ to a first SCell, wherein the MAC CE message is carried in a first PUSCH at slot n, and the first PUSCH corresponds to a first HARQ process number; monitoring a first DCI in a first time window, wherein the first DCI is used for scheduling the first PUSCH corresponding to the first HARQ process number; and in response to not receiving the first DCI within the first time window, determining that beam failure recovery for the first SCell is completed.

BRIEF DESCRIPTION OF THE DRAWINGS

The accompanying drawings are described here to provide a further understanding of the disclosure, and form a part of the disclosure. The embodiments of the disclosure and description thereof are used to explain the disclosure, and do not intended to limit the disclosure. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

The technical solutions in the embodiments of the disclosure may be applied to various communication systems, for example, a Long Term Evolution (LTE) system, a LTE Frequency Division Duplex (FDD) system, a LTE Time Division Duplex (TDD) system, a 5th Generation (5G) communication system or a future communication system.

Figures 1, 2:
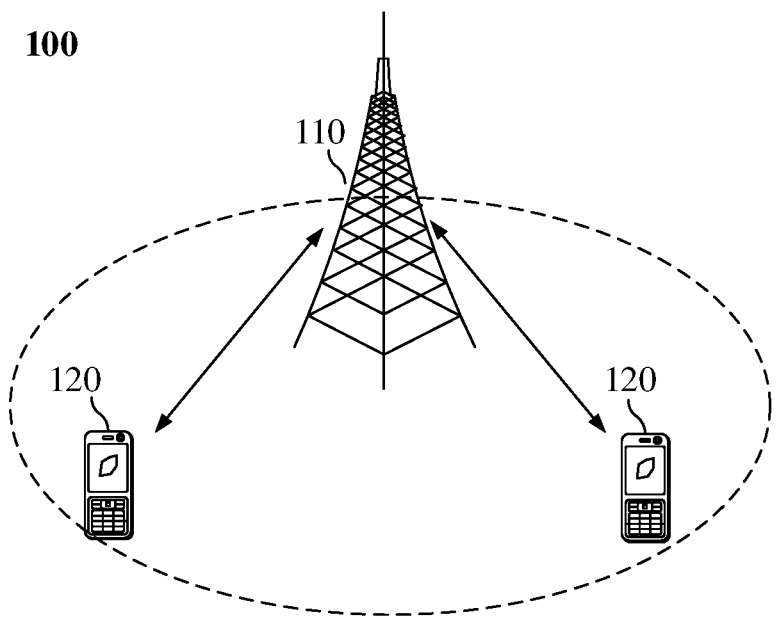
FIG. 1 is a diagram illustrating architecture of a communication system according to an embodiment of the disclosure.
FIG. 2 is a flowchart illustrating a method for beam management according to an embodiment of the disclosure.

FIG. 1 illustrates a communication system 100 to which the embodiments of the disclosure is applied. The communication system 100 may include a network device 110. The network device 110 may be a device that communicates with a terminal 120 (or called a communication terminal or terminal). The network device 110 may provide communication coverage for a specific geographic area, and may communicate with terminals within the coverage area. Optionally, the network device 110 may be an Evolutional Node B (eNB or eNodeB) in an LTE system or a wireless controller in a Cloud Radio Access Network (CRAN); or the network device may be a mobile switching center, a relay station, an access point, a vehicle-mounted device, a wearable device, a hub, a switch, a network bridge, a router, a network device in a 5G network, or a network device in a future communication system, etc.

The communication system 100 may also include at least one terminal 120 within the coverage area of the network device 110. The terminal used herein may include, but is not limited to, a device that is configured to receive/transmit communication signals via a wired connection (such as via a Public Switched Telephone Networks (PSTN), Digital Subscriber Line (DSL), digital cable, direct cable connection), and/or via another data connection/network, and/or via a wireless interface, for example, a cellular network, a Wireless Local Area Network (WLAN), a Digital TV network such as Digital Video Broadcasting Handheld (DVB-H) network, a satellite network, an Amplitude Modulation (AM)-Frequency Modulation (FM) broadcast transmitter and/or via another communication terminal; and an Internet of Things (IoT) device. A terminal configured to communicate over a wireless interface may be called "a wireless communication terminal", "a wireless terminal" or "a mobile terminal". Examples of the mobile terminal may include, but are not limited to, a satellite or cellular phone; a personal communications system (PCS) terminal that can combine a cellular radio telephone with data processing, facsimile, and data communication capabilities; a Personal Digital Assistant (PDA) that can include a radiotelephone, a pager, an Internet/intranet access, a Web browser, a notebook, calendar and/or a Global Positioning System (GPS) receiver; and a conventional laptop and/or palmtop receiver, or other electronic devices including radiotelephone transceivers. The terminal may be an access terminal, UE, a user unit, a user station, a mobile station, a mobile platform, a remote station, a remote terminal, a mobile device, a user terminal, a terminal, a wireless communication device and a user proxy or user device. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, a vehicle-amounted device, a wearable device, a terminal in a 5G network, or a terminal in a future evolved Public Land Mobile Network (PLMN).

Optionally, a Device to Device (D2D) communication may be performed between the terminals 120.

Optionally, the 5G communication system or 5G network may also be called a New Radio (NR) system or NR network.

FIG. 1 exemplarily illustrates one network device and two terminals. Optionally, the communication system 100 may include multiple network devices and other numbers of terminals may be within the coverage of each network device. This is not limited in the embodiments of the present disclosure.

Optionally, the communication system 100 may further include other network entities such as a network controller, a mobility management entity and the like. This is not limited in the embodiments of the present disclosure.

It should be understood that in the embodiments of the present disclosure, the device having a communication function in the network/system may be called a communication device. Taking the communication system 100 illustrated in FIG. 1 as an example, the communication device may include a network device 110 and a terminal 120 having a communication function. The network device 110 and the terminal 120 may be the specific devices described above, and are not described herein again. The communication device may also include other devices in the communication system 100, such as other network entities such as a network controller and a mobile management entity, which are not limited in the embodiments of the present disclosure.

It should be understood that the terms "system" and "network" in the present disclosure are usually used interchangeably. The term "and/or" in the present disclosure is only an association relationship describing associated objects and represents that three relationships may exist. For example, A and/or B may represent three conditions: i.e., independent existence of A, existence of both A and B and independent existence of B. In addition, character "/" in the present disclosure usually represents that previous and next associated objects form an "or" relationship.

For better understanding of the technical solutions in the embodiments of the present disclosure, the technical solutions related to the embodiments of the present disclosure are described in more detail below.

In NR specification release 15, a spatial setting for a Physical Uplink Control Channel (PUCCH) transmission is provided by PUCCH-SpatialRelationInfo if the UE is configured with a single value for pucch-SpatialRelationInfold; otherwise, if the UE is provided multiple values for PUCCH-SpatialRelationInfo, the UE determines a spatial setting for the PUCCH transmission as described in [11, TS 38.321]. The UE applies corresponding actions in [11, TS 38.321] and a corresponding setting for a spatial domain filter to transmit PUCCH 3 msec after a slot where the UE transmits Hybrid Automatic Repeat reQuest (HARD)-Acknowledge (ACK) information with ACK value corresponding to a Physical Downlink Shared Channel (PDSCH) reception providing the PUCCH-SpatialRelationInfo.

If PUCCH-SpatialRelationInfo provides ssb-Index, the UE transmits the PUCCH using a same spatial domain filter as for a reception of a SS/PBCH block with index provided by ssb-Index for a same serving cell or, if servingCellId is provided, for a serving cell indicated by servingCellId;

else if PUCCH-SpatialRelationInfo provides csi-RS-Index, the UE transmits the PUCCH using a same spatial domain filter as for a reception of a CSI-RS with resource index provided by csi-RS-Index for a same serving cell or, if servingCellId is provided, for a serving cell indicated by servingCellId;

else PUCCH-SpatialRelationInfo provides srs, the UE transmits the PUCCH using a same spatial domain filter as for a transmission of a Sounding Reference Signal (SRS) with resource index provided by resource for a same serving cell and/or active Uplink (UL) Band Width Part (BWP) or, if servingCellId and/or uplinkBWP are provided, for a serving cell indicated by servingCellId and/or for an UL BWP indicated by uplinkBWP.

For an SRS resource, a configuration of the spatial relation between a reference RS and the target SRS, where the higher layer parameter spatialRelationInfo, if configured, contains an Identifier (ID) of the reference RS. The reference RS may be an SS/PBCH block, CSI-RS configured on serving cell indicated by higher layer parameter servingCellId if present, same serving cell as the target SRS otherwise, or an SRS configured on uplink BWP indicated by the higher layer parameter uplinkBWP, and serving cell indicated by the higher layer parameter servingCellId if present, same serving cell as the target SRS otherwise.

For the BFR of Primary Cell (PCell), a UE is provided with a set q of periodic CSI-RS resource configuration indexes and/or SS/PBCH block indexes by candidateBeamRSList for identifying at least one new beam RS when beam failure happens in the PCell.

For L1-Signal to Interference plus Noise Ratio (SINR) based beam reporting, the following reporting contents are supported:

TABLE 1

| CSI report number | CSI fields |
|---|---|
| CSI report #n | CRI or SSBRI #1, if reported |
| | CRI or SSBRI #2, if reported |
| | CRI or SSBRI #3, if reported |
| | CRI or SSBRI #4, if reported |
| | SINR #1, if reported |
| | Differential SINR #2, if reported |
| | Differential SINR #3, if reported |
| | Differential SINR #4, if reported | where the report mapping for a SINR value is:

TABLE 2

| Reported value | Measured quantity value | Unit |
|---|---|---|
| SS-SINR_0 | SS-SINR < −23 | dB |
| SS-SINR_1 | −23 ≤ SS-SINR < −22.5 | dB |
| SS-SINR_2 | −22.5 ≤ SS-SINR < −22 | dB |
| SS-SINR_3 | −22 ≤ SS-SINR < −21.5 | dB |
| SS-SINR_4 | −21.5 ≤ SS-SINR < −21 | dB |
| ... | ... | ... |
| SS-SINR_123 | 38 ≤ SS-SINR < 38.5 | dB |
| SS-SINR_124 | 38.5 ≤ SS-SINR < 39 | dB |
| SS-SINR_125 | 39 ≤ SS-SINR < 39.5 | dB |
| SS-SINR_126 | 39.5 ≤ SS-SINR < 40 | dB |
| SS-SINR_127 | 40 ≤ SS-SINR | dB |

Four issues are addressed in this invention. The first problem is in SCell BFR, the UE behavior when candidate new beam RSs are not configured is not clear. Forcing the NW to configure candidate new beam RSs (that can be up to 64 RSs) for every SCell would increase the overhead of the RRC signaling. The second problem is a response for Media Access Control (MAC) Control Element (CE) message of Beam Failure Recovery reQuest (BFRQ) in SCell BFR is not properly specified. Regarding the 'response' to the MAC CE of BFRQ for a SCell, the current design is the ACK of uplink HARQ operation for Physical Uplink Shared Channel (PUSCH) transmission. The current design would cause two consequences: the gNB has to send a dummy Downlink Control Information (DCI) to schedule a new transmission for the same HARQ process number, which causes signaling overhead and imposes limitation to system implementation; the UE could wait for the 'ACK' from the gNB for a long time, which would result in long latency in SCell beam failure recovery. The third problem is the reporting value for differential L1-SINR is not defined. The fourth problem is about how to determine the default transmit beam for a PUCCH or SRS resource. One current method is to use the same method to determine the default Transmission (Tx) beam for PUCCH and SRS resource for both UE with beam correspondence capability and UE without beam correspondence capability. That is not good solution for UE without beam correspondence because such UE is not able to determine uplink transmit beam based on downlink reference signals. For a UE without beam correspondence, using a Tx beam determined from a Downlink (DL) RS for uplink transmission would cause loss in uplink quality.

To this end, the following technical solutions in the embodiments of the present disclosure are proposed. In this disclosure, the following new methods for beam management and SCell beam failure recovery are presented.

The methods for a UE to formulate default candidate new beam RS set when higher layer does not configure candidate new beam RS for one SCell BFR. Specially, the UE determine the candidate new beam RS set for one SCell according to whether the SCell is in the same band as the PCell or Primary Secondary cell (PSCell) in the same cell group. If they are in the same band, the UE would assume the SS/PBCH blocks in the PCell or PSCell as the candidate new beam RS set for that SCell.

The methods of UE behavior after sending MAC CE of SCell BFRQ: the UE is configured with a time window length. The UE can assume an ACK for the SCell BFRQ transmission if the UE does not receive DCI scheduling re-transmission for the same HARQ process number within the configured time window.

The methods of differential L1-SINR: new tables for mapping reporting values for differential L1-SINR are presented. A special reporting value is used to represent the special case of corresponding L1-SINR measurement.

The method to determine a default Tx beam for a PUCCH resource and an SRS resource for UE without beam correspondence if higher layer parameter does not configure spatial relation for a PUCCH resource or an SRS resource. Specially, the default Tx beam for a PUCCH or SRS is the Tx beam used to transmit Message1 (msg1) in the most recent Random Access Channel (RACH) transmission.

The technical solutions in the embodiments of the present disclosure will be described in detail below.

FIG. 2 is a flowchart illustrating a method for beam management according to an embodiment of the disclosure. As shown in FIG. 2, the method for beam management includes the following operations.

At block 201, in the case that a UE is not configured with candidate new beam RSs for a first SCell, the UE determines CSI-RS resources and/or SSBs in a target cell as the candidate new beam RSs for the first SCell. The candidate new beam RSs are used for a beam failure recovery for the first SCell. The first SCell is in a same frequency band as the target cell.

Candidate New Beam RSs for SCell

In the embodiment of the disclosure, if a UE is not configured with candidate new beam RSs for a first SCell, the UE determines CSI-RS resources and/or SSBs in a target cell as the candidate new beam RSs for the first SCell.

In an implementation, the target cell is a PCell or PScell in a first cell group, and the first cell group refers to a cell group to which the first SCell belongs. Correspondingly, the UE determines all SSBs on the PCell or the PScell as the candidate new beam RSs for the first SCell.

In an implementation, the target cell is a PCell or PScell in a first cell group, and the first cell group refers to a cell group to which the first SCell belongs. Correspondingly, the UE determines CSI-RS resources and/or SSBs configured for the PCell or PSCell as the candidate new beam RSs for the first SCell.

In an implementation, the target cell is a second Scell in a first cell group, and the first cell group refers to a cell group to which the first SCell belongs. Correspondingly, the UE determines CSI-RS resources and/or SSBs configured for the second Scell as the candidate new beam RSs for the first SCell.

Further, A) if the UE is configured with CSI-RS resources and/or SSBs for one SCell, the second SCell is the one SCell; or B) if the UE is configured with CSI-RS resources and/or SSBs for multiple SCells, the second SCell is the SCell with lowest serving cell index among the multiple SCells.

In an example, a UE can be configured with one or more CSI-RS resources or SS/PBCH blocks as the candidate new beam RSs for a SCell. When beam failure happens in the SCell, the UE can select a first RS from those CSI-RS resources or SS/PBCH blocks configured as the candidate new beam RSs and then report ID of the first RS to the gNB. The first RS shall satisfy the condition that the L1-Reference Signal Received Power (RSRP) measurement is not less than a configured threshold. For a first SCell, if the UE is configured to operate beam failure recovery for the first SCell but the UE is not provided with the configuration of CSI-RS resources or SS/PBCH blocks, the UE can be requested to do one or more of the followings.

- If the first SCell is in the same frequency band as the PCell or the PSCell of the cell group of the first SCell, the UE shall assume to use all the SS/PBCH blocks on the PCell or PSCell of the cell group of the first SCell as the candidate new beam RS for the beam failure recovery of the first SCell.
- If the first SCell is in the same frequency band as the PCell or the PSCell of the cell group of the first SCell, the UE shall assume the CSI-RS resources and/or SS/PBCH blocks configured in candidateBeamRSList provided for the PCell or PSCell as the candidate new beam RSs for the first SCell.
- If the UE is provided configuration of CSI-RS resources or SS/PBCH blocks as candidate new beam RSs for a second SCell of the cell group of the first SCell, and the second SCell is in the same frequency band as the first SCell, then the UE can assume to use the candidate new beam RSs configured for the second SCell as the candidate new beam RSs for the beam failure recovery of the first SCell.
- If the UE is provided configuration of CSI-RS resources or SS/PBCH blocks as candidate new beam RSs for a second SCell of the cell group of the first SCell and if the UE is provided configuration of CSI-RS resources or SS/PBCH blocks as candidate new beam RSs for a third SCell of the cell group of the first SCell, and the second SCell and the third SCell are in the same frequency band as the first SCell, then the UE can assume to use the candidate new beam RSs configured for SCell with lowest serving cell index among the second SCell and the third SCell as the candidate new beam RSs for the beam failure recovery of the first SCell.

In the above solution, the UE may use any of the following manners to determine the candidate new beam RSs for the first SCell.

First Manner

If the first SCell is in the same frequency band as the PCell or PSCell in the first cell group, the UE determines all SSBs on the PCell or PSCell as the candidate new beam RSs for the first SCell. The first cell group refers to a cell group to which the first SCell belongs.

In an example, for a first SCell, the UE is configured to operate beam failure recovery for the first SCell. If the UE is not provided candidate new beam RS configuration for the first SCell, the UE shall find the candidate new beam RSs for the BFR of the first SCell as follows.
1) If the first SCell is in the same frequency band as the PCell or PSCell of the cell group of the first SCell, the UE shall assume the SS/PBCH blocks on the PCell or PSCell of the cell group of the first SCell as the candidate beam RSs for the BFR of the first SCell.
2) Otherwise, the UE assumes no candidate new beam RSs are configured for the BFR of the first SCell.

A UE can be provided, for each BWP of a serving secondary cell, a set $\bar{q}_1$ of periodic CSI-RS resources configuration indexes and/or SS/PBCH blocks indexes by higher layer parameter candidateBeamRSList for radio link measurement on the secondary cell. If the UE is not provided higher layer parameter candidateBeamRSList, the UE determines the set $\bar{q}_1$ to include all the SS/PBCH block indexes on the PCell or PSCell of the cell group of the serving secondary cell if the PCell or PSCell of the cell group of the serving secondary cell and the serving secondary cell are in the same frequency band.

Second Manner

If the first SCell is in the same frequency band as the PCell or PSCell in the first cell group, the UE determines the CSI-RS resources and/or SSBs configured for the PCell or PSCell as the candidate new beam RSs for the first SCell. The first cell group refers to a cell group to which the first SCell belongs.

In an example, for a first SCell, the UE is configured to operate beam failure recovery for the first SCell. If the UE is not provided candidate new beam RS configuration for the first SCell, the UE shall find the candidate new beam RSs for the BFR of the first SCell as follows.
1) If the first SCell is in the same frequency band as the PCell or PSCell of the cell group of the first SCell, the UE shall assume that the CSI-RS resources and/or SS/PBCH blocks provided in higher layer parameter candidateBeamRSList configured for the PCell or PSCell of the cell group of the first SCell are the candidate beam RSs for the BFR of the first SCell.
2) Otherwise, the UE assumes no candidate new beam RSs are configured for the BFR of the first SCell.

A UE can be provided, for each BWP of a serving secondary cell, a set $\bar{q}_1$ of periodic CSI-RS resources configuration indexes and/or SS/PBCH block indexes by higher layer parameter candidateBeamRSList for radio link measurement on the secondary cell. If the UE is not provided higher layer parameter candidateBeamRSList, the UE determines the set $\bar{q}_1$ to include all the CSI-RS configuration indexes and/or SS/PBCH block indexes provided by higher layer parameter candidateBeamRSList that is configured for a BWP of the PCell or PSCell of the cell group of the serving secondary cell if the PCell or PSCell of the cell group of the serving secondary cell and the serving secondary cell are in the same frequency band. The BWP can be the BWP with lowest BWP ID that is configured with higher layer parameter candidateBeamRSList.

Third Manner

The first SCell is in the same frequency band as the PCell or PSCell in the first cell group.

If the UE is configured with CSI-RS resources and/or SSBs for the PCell or PScell, the UE determines the CSI-RS resources and/or SSBs configured for the PCell or PScell as the candidate new beam RSs for the first SCell.

Otherwise, if the UE is not configured with CSI-RS resources and/or SSBs for the PCell or PScell, the UE determines all SSBs on the PCell or PScell as the candidate new beam RSs for the first SCell.

The first cell group refers to a cell group to which the first SCell belongs.

In an example, for a first SCell, the UE is configured to operate beam failure recovery for the first SCell. If the UE is not provided candidate new beam RS configuration for the first SCell, the UE shall find the candidate new beam RSs for the BFR of the first SCell as follows.
1) If the first SCell is in the same frequency band as the PCell or PSCell of the cell group of the first SCell,
   i) if higher layer parameter candidateBeamRSList is provided for the PCell or PSCell of the cell group of the first SCell, the UE shall assume the CSI-RS resources and/or SS/PBCH blocks provided in higher layer parameter candidateBeamRSList configured for the PCell or PSCell of the cell group of the first SCell are the candidate beam RSs for the BFR of the first SCell;

ii) if no higher layer parameter candidateBeamRSList is provided for the PCell or PSCell of the cell group of the first SCell, the UE shall assume the SS/PBCH blocks on the PCell or PSCell of the cell group of the first SCell are the candidate beam RSs for the BFR of the first SCell.

2) Otherwise, the UE assumes there is no candidate new beam RSs configured for the BFR of the first SCell.

Fourth Manner

If the UE is configured with CSI-RS resources and/or SSBs for multiple SCells, at least one of the multiple SCells is in the same frequency band as the first SCell, and the multiple SCells and the first SCell belong to the same cell group, then the UE determines the CSI-RS resources and/or SSBs for the SCell with the lowest serving cell index among the at least one SCell as the candidate new beam RSs for the first SCell.

If the UE is configured with CSI-RS resources and/or SSBs for the PCell or PScell, the first SCell is in the same frequency band as the PCell or PSCell in the first cell group, and the PCell or PScell belongs to the same cell group as the first SCell, then the UE determines the CSI-RS resource and/or SSBs configured for the PCell or PScell as the candidate new beam RSs for the first SCell. Otherwise, if the UE is not configured with CSI-RS resources and/or SSBs for the PCell or PScell, the first SCell is in the same frequency band as the PCell or PSCell in the first cell group, and the PCell or PScell belongs to the same cell group as the first SCell, then the UE determines all SSBs on the PCell or PScell as the candidate new beam RSs for the first SCell.

In an example, for a first SCell, the UE is configured to operate beam failure recovery for the first SCell. If the UE is not provided candidate new beam RS configuration for the first SCell, the UE shall find the candidate new beam RSs for the BFR of the first SCell as follows.

1) If the UE is provided with configuration of CSI-RS resources or SS/PBCH blocks for candidate new beam RSs for beam failure recovery for one or more SCells of the cell group of the first SCell and at least one of those SCells are in the same frequency band as the first SCell:

i) the UE can assume the candidate new beam RSs configured to the SCell with lowest serving cell ID among those SCells configured with candidate new beam RS and in the same frequency band as the first SCell as the candidate new beam RS for the first SCell.

2) Otherwise, if the first SCell is in the same frequency band as the PCell or PSCell of the cell group of the first SCell, i) if higher layer parameter candidateBeamRSList is provided for the PCell or PSCell of the cell group of the first SCell, the UE shall assume the CSI-RS resources and/or SS/PBCH blocks provided in higher layer parameter candidateBeamRSList configured for the PCell or PSCell of the cell group of the first SCell are the candidate beam RSs for the BFR of the first SCell;

ii) if no higher layer parameter candidateBeamRSList is provided for the PCell or PSCell of the cell group of the first SCell, the UE shall assume the SS/PBCH blocks on the PCell or PSCell of the cell group of the first SCell are the candidate beam RSs for the BFR of the first SCell.

3) Otherwise, the UE assume there are no candidate new beam RSs for the BFR of the first SCell.

A UE can be provided, for each BWP of a secondary cell, a set of periodic CSI-RS resources configuration indexes and/or SS/PBCH block indexes by higher layer parameter candidateBeamRSList for radio link measurement on the secondary cell.

The disclosure further includes the following technical solutions. It should be noted that the following technical solutions may be implemented in any combination with the above-mentioned technical solutions, or may be implemented separately.

UE Behavior for Step 2 MAC CE

In the embodiment of the present disclosure, the UE sends a MAC CE message for BFRQ to the first SCell, and the MAC CE message is carried in a first PUSCH at slot n. The first PUSCH corresponds to a first HARQ process number. The UE monitors a first DCI in a first time window, and the first DCI is used for scheduling the PUSCH corresponding to the first HARQ process number. If the UE does not receive the first DCI within the first time window, the UE determines that the beam failure recovery for the first SCell is completed.

Here, the first time window is started after the slot n. In an implementation, the first time window is started from slot n+1.

In an example, the UE can be configured with a time window length $T_0$ for a SCell and the UE is requested to use the time window to declare the completeness of beam failure recovery of the SCell. After the UE sends the MAC CE message of SCell BFRQ in one PUSCH of uplink grant with a first HARQ process number at slot n, the UE can monitor DCI scheduling uplink grant for the same HARQ process number within the time window $T_0$ from slot n+1. If the UE does not receive DCI scheduling uplink grant with first HARQ process number for a PUSCH retransmission within the time window, the UE can declare the beam failure recovery for the SCell is completed. The UE can be requested to: if the UE does not receive any DCI scheduling uplink grant for the first HARQ process number within the time window, the UE can declare the beam failure recovery for the SCell is completed.

In one method, if a candidate beam RS ID is carried in the MAC CE message of SCell BFRQ, the UE can assume a Physical Downlink Control Channel (PDCCH) and PDSCH are quasi-collocated with the CSI-RS resource or SS/PBCH block that is identified by the candidate beam RS ID carried in the MAC CE message of SCell BFRQ starting from the slot when the UE declares the beam failure recovery of the SCell is completed until the UE receives by higher layer an activation for Transmission Configuration Indicator (TCI) state or any of the parameters TCI-StatesPDCCH-ToAddlist and/or TCI-StatesPDCCH-ToReleaseList for the SCell.

Differential L1-SINR

In the embodiment of the present disclosure, the UE reports N reference signal resource indicators, and reports the L1-SINR corresponding to each reference signal resource indicator in the N reference signal resource indicators, where N is a positive integer. Here, the reference signal resource indicator includes CSI-RS resource indicator (CRI) and/or SS/PBCH block resource indicator (SSBRI) (hereinafter referred to as CRI/SSBRI).

Further, in the case of N>1, the UE reports L1-SINR for a first reference signal resource indicator in the N reference signal resource indicators, and reports differential L1-SINR of L1-SINR for each reference signal resource indicator in N−1 reference signal resource indicators other than the first reference signal resource indicator in the N reference signal resource indicators relative to a reference SINR. Optionally, among the N reference signal resource indicators, the L1-SINR for the first reference signal resource indicator has a maximum value.

In an implementation, the reference SINR is the L1-SINR for the first reference signal resource indicator.

In an implementation, in a case where the L1-SINR for the first reference signal resource indicator is greater than or equal to a first threshold, the reference SINR is the first threshold.

In an implementation, in a case where the L1-SINR for the first reference signal resource indicator is less than a second threshold, the reference SINR is the second threshold.

In the embodiment of the disclosure, a reported value of the L1-SINR for the first reference signal resource indicator is characterized by M1 bits. The reported value of the L1-SINR for the first reference signal resource indicator is determined based on a range in which a measured quantity value of the L1-SINR for the first reference signal resource indicator is located. M1 is a positive integer.

In the embodiment of the disclosure, a reported value of the differential L1-SINR for each reference signal resource indicator in N−1 reference signal resource indicators is characterized by M2 bits. The reported value of the differential L1-SINR for the reference signal resource indicator is determined based on a range in which a measured quantity value of the differential L1-SINR for the reference signal resource indicator is located. M2 is a positive integer. The measured quantity value of the differential L1-SINR for the reference signal resource indicator refers to a difference of a measured quantity value of the L1-SINR for the reference signal resource indicator relative to the reference SINR.

In an example, a UE can be configured to report N>1 CRI/SSBRI and the corresponding L1-SINR measurements for each reported CRI/SSBRI. If N>1, the UE reports L1-SINR value for the CRI/SSBRI with largest L1-SINR and report differential L1-SINR for all other CRI/SSBRI reported in the same reporting instance. The differential L1-SINR is calculated as the difference between measured L1-SINR of one CRI and the measured L1-SINR of the CRI that is reported with largest L1-SINR in one reporting instance. 7 bits (i.e. M1=7) are used for reported L1-SINR and the mapping of measured L1-SINR quantity is defined in Table 3.

TABLE 3

| Reported value | Measured quantity value | Unit |
| --- | --- | --- |
| SS-SINR_0 | SS-SINR < −23 | dB |
| SS-SINR_1 | −23 ≤ SS-SINR < −22.5 | dB |
| SS-SINR_2 | −22.5 ≤ SS-SINR < −22 | dB |
| SS-SINR_3 | −22 ≤ SS-SINR < −21.5 | dB |
| SS-SINR_4 | −21.5 ≤ SS-SINR < −21 | dB |
| . . . | . . . | . . . |
| SS-SINR_123 | 38 ≤ SS-SINR < 38.5 | dB |
| SS-SINR_124 | 38.5 ≤ SS-SINR < 39 | dB |
| SS-SINR_125 | 39 ≤ SS-SINR < 39.5 | dB |
| SS-SINR_126 | 39.5 ≤ SS-SINR < 40 | dB |
| SS-SINR_127 | 40 ≤ SS-SINR | dB |

In an implementation, 4 bits (i.e. M2=4) are used for one differential L1-SINR reporting and the mapping of measured differential L1-SINR quantity can be defined in one of the tables 4a, 4b and 4c, where $\Delta$SINR is the difference in measured L1-SINR from the strongest L1-SINR.

In one example, 0.5 dB step size is used for reported value of differential L1-SINR and the mapping method for reported value is shown in Table 4a.

TABLE 4a

| Reported value | Measured quantity value (difference in measured SINR from strongest SINR) | Unit |
| --- | --- | --- |
| DIFFSINR_0 | 0 ≥ $\Delta$SINR > −0.5 | dB |
| DIFFSINR_1 | −0.5 ≥ $\Delta$SINR > −1 | dB |
| DIFFSINR_2 | −1 ≥ $\Delta$SINR > −1.5 | dB |
| DIFFSINR_3 | −1.5 ≥ $\Delta$SINR > −2 | dB |
| DIFFSINR_4 | −2 ≥ $\Delta$SINR > −2.5 | dB |
| DIFFSINR_5 | −2.5 ≥ $\Delta$SINR > −3 | dB |
| DIFFSINR_6 | −3 ≥ $\Delta$SINR > −3.5 | dB |
| DIFFSINR_7 | −3.5 ≥ $\Delta$SINR > −4 | dB |
| DIFFSINR_8 | −4 ≥ $\Delta$SINR > −4.5 | dB |
| DIFFSINR_9 | −4.5 ≥ $\Delta$SINR > −5 | dB |
| DIFFSINR_10 | −5 ≥ $\Delta$SINR > −5.5 | dB |
| DIFFSINR_11 | −5.5 ≥ $\Delta$SINR > −6 | dB |
| DIFFSINR_12 | −6 ≥ $\Delta$SINR > −6.5 | dB |
| DIFFSINR_13 | −6.5 ≥ $\Delta$SINR > −7 | dB |
| DIFFSINR_14 | −7 ≥ $\Delta$SINR > −7.5 | dB |
| DIFFSINR_15 | −7.5 ≥ $\Delta$SINR | dB |

In one example, 1 dB step size is used for reported value of differential L1-SINR and the mapping method for reported value is shown in Table 4b.

TABLE 4b

| Reported value | Measured quantity value (difference in measured SINR from strongest SINR) | Unit |
| --- | --- | --- |
| DIFFSINR_0 | 0 ≥ $\Delta$SINR > −1 | dB |
| DIFFSINR_1 | −1 ≥ $\Delta$SINR > −2 | dB |
| DIFFSINR_2 | −2 ≥ $\Delta$SINR > −3 | dB |
| DIFFSINR_3 | −3 ≥ $\Delta$SINR > −4 | dB |
| DIFFSINR_4 | −4 ≥ $\Delta$SINR > −5 | dB |
| DIFFSINR_5 | −5 ≥ $\Delta$SINR > −6 | dB |
| DIFFSINR_6 | −6 ≥ $\Delta$SINR > −7 | dB |
| DIFFSINR_7 | −7 ≥ $\Delta$SINR > −8 | dB |
| DIFFSINR_8 | −8 ≥ $\Delta$SINR > −9 | dB |
| DIFFSINR_9 | −9 ≥ $\Delta$SINR > −10 | dB |
| DIFFSINR_10 | −10 ≥ $\Delta$SINR > −11 | dB |
| DIFFSINR_11 | −11 ≥ $\Delta$SINR > −12 | dB |
| DIFFSINR_12 | −12 ≥ $\Delta$SINR > −13 | dB |
| DIFFSINR_13 | −13 ≥ $\Delta$SINR > −14 | dB |
| DIFFSINR_14 | −14 ≥ $\Delta$SINR > −15 | dB |
| DIFFSINR_15 | −15 ≥ $\Delta$SINR | dB |

In one example, 2 dB step size is used for reported value of differential L1-SINR and the mapping method for reported value is shown in Table 4c.

TABLE 4c

| Reported value | Measured quantity value (difference in measured SINR from strongest SINR) | Unit |
| --- | --- | --- |
| DIFFSINR_0 | 0 ≥ $\Delta$SINR > −2 | dB |
| DIFFSINR_1 | −2 ≥ $\Delta$SINR > −4 | dB |
| DIFFSINR_2 | −4 ≥ $\Delta$SINR > −6 | dB |
| DIFFSINR_3 | −6 ≥ $\Delta$SINR > −8 | dB |
| DIFFSINR_4 | −8 ≥ $\Delta$SINR > −10 | dB |

TABLE 4c-continued

| Reported value | Measured quantity value (difference in measured SINR from strongest SINR) | Unit |
|---|---|---|
| DIFFSINR_5 | $-10 \geq \Delta SINR > -12$ | dB |
| DIFFSINR_6 | $-12 \geq \Delta SINR > -14$ | dB |
| DIFFSINR_7 | $-14 \geq \Delta SINR > -16$ | dB |
| DIFFSINR_8 | $-16 \geq \Delta SINR > -18$ | dB |
| DIFFSINR_9 | $-18 \geq \Delta SINR > -20$ | dB |
| DIFFSINR_10 | $-20 \geq \Delta SINR > -22$ | dB |
| DIFFSINR_11 | $-22 \geq \Delta SINR > -24$ | dB |
| DIFFSINR_12 | $-24 \geq \Delta SINR > -26$ | dB |
| DIFFSINR_13 | $-26 \geq \Delta SINR > -28$ | dB |
| DIFFSINR_14 | $-28 \geq \Delta SINR > -30$ | dB |
| DIFFSINR_15 | $-30 \geq \Delta SINR$ | dB |

In an implementation, if the reported value of L1-SINR in one reporting instance is SS-SINR_127 in Table 3, i.e., the measured L1-SINR of the CRI/SSBRI with largest L1-SINR is not less than 40 dB (i.e., the first threshold) as shown in Table 3, the UE can be requested to calculated a differential L1-SINR value by using 40 dB as the reference and calculate a differential L1-SINR of one CRI/SSBRI as the difference between the measured L1-SINR of the CRI/SSBRI and 40 dB. One special reported value for differential L1-SINR can be used to indicate that the corresponding L1-SINR measurement is >=40 dB. In one example, the UE can be requested to use Tables 5a and 5b to calculate the reported value for one differential L1-SINR. In the example, DIFFSINR_15 can indicate that the corresponding L1-SINR measurement is >=40 dB.

TABLE 5a

| Reported value | Measured quantity value (difference in measured SINR from strongest SINR) | Unit |
|---|---|---|
| DIFFSINR_0 | $0 \geq \Delta SINR > -1$ | dB |
| DIFFSINR_1 | $-1 \geq \Delta SINR > -2$ | dB |
| DIFFSINR_2 | $-2 \geq \Delta SINR > -3$ | dB |
| DIFFSINR_3 | $-3 \geq \Delta SINR > -4$ | dB |
| DIFFSINR_4 | $-4 \geq \Delta SINR > -5$ | dB |
| DIFFSINR_5 | $-5 \geq \Delta SINR > -6$ | dB |
| DIFFSINR_6 | $-6 \geq \Delta SINR > -7$ | dB |
| DIFFSINR_7 | $-7 \geq \Delta SINR > -8$ | dB |
| DIFFSINR_8 | $-8 \geq \Delta SINR > -9$ | dB |
| DIFFSINR_9 | $-9 \geq \Delta SINR > -10$ | dB |
| DIFFSINR_10 | $-10 \geq \Delta SINR > -11$ | dB |
| DIFFSINR_11 | $-11 \geq \Delta SINR > -12$ | dB |
| DIFFSINR_12 | $-12 \geq \Delta SINR > -13$ | dB |
| DIFFSINR_13 | $-13 \geq \Delta SINR > -14$ | dB |
| DIFFSINR_14 | $-14 \geq \Delta SINR$ | dB |
| DIFFSINR_15 | The corresponding L1-SINR measurement is >=40 dB | dB |

TABLE 5b

| Reported value | Measured quantity value (difference in measured SINR from strongest SINR) | Unit |
|---|---|---|
| DIFFSINR_0 | $0 \geq \Delta SINR > -2$ | dB |
| DIFFSINR_1 | $-2 \geq \Delta SINR > -4$ | dB |
| DIFFSINR_2 | $-4 \geq \Delta SINR > -6$ | dB |
| DIFFSINR_3 | $-6 \geq \Delta SINR > -8$ | dB |
| DIFFSINR_4 | $-8 \geq \Delta SINR > -10$ | dB |
| DIFFSINR_5 | $-10 \geq \Delta SINR > -12$ | dB |
| DIFFSINR_6 | $-12 \geq \Delta SINR > -14$ | dB |
| DIFFSINR_7 | $-14 \geq \Delta SINR > -16$ | dB |
| DIFFSINR_8 | $-16 \geq \Delta SINR > -18$ | dB |
| DIFFSINR_9 | $-18 \geq \Delta SINR > -20$ | dB |
| DIFFSINR_10 | $-20 \geq \Delta SINR > -22$ | dB |
| DIFFSINR_11 | $-22 \geq \Delta SINR > -24$ | dB |
| DIFFSINR_12 | $-24 \geq \Delta SINR > -26$ | dB |
| DIFFSINR_13 | $-26 \geq \Delta SINR > -28$ | dB |
| DIFFSINR_14 | $-28 \geq \Delta SINR$ | dB |
| DIFFSINR_15 | The corresponding L-SINR measurement is >=40 dB | dB |

In an implementation, if the reported value of L1-SINR in one reporting instance is SS-SINR_0 in Table 3, i.e., the measured L1-SINR of the CRI/SSBRI with largest L1-SINR is less than −23 dB (i.e., the second threshold) as shown in Table 3, the UE can be requested to calculated a differential L1-SINR value by using −23 dB as the reference and calculate a differential L1-SINR of one CRI/SSBRI as the difference between the measured L1-SINR of the CRI/SSBRI and −23 dB.

In an implementation, the UE can be requested to determine the method of calculating reported value for differential L1-SINR values based on the reported value of the L1-SINR value in the same reporting instance. In one example, if the reported value of L1-SINR in one reporting instance is ≥a first threshold, then the UE shall use method 1 to calculate the reported value of a differential L1-SINR and if the reported value of L1-SINR in one reporting instance is <the first threshold, then the UE shall use method 2 to calculate the reported value of a differential L1-SINR.

In one example, 4-bits are used for reported value of a differential L1-SINR and the step size for reported value is 1 dB. The UE is configured or preconfigured with a first threshold is −8 dB. The UE is configured to report N>1 CRI/SSBRI and corresponding L1-SINR or differential L1-SINR. Then the UE shall calculate reported value for a differential L1-SINR as follows.

1) If the reported value of L1-SINR is ≥−8 dB, then UE shall use Table 6a to calculate the reported value for a differential L1-SINR, where ΔSINR is the difference in measured L1-SINR from the strongest L1-SINR.

TABLE 6a

| Reported value | Measured quantity value (difference in measured SINR from strongest SINR) | Unit |
|---|---|---|
| DIFFSINR_0 | $0 \geq \Delta SINR > -1$ | dB |
| DIFFSINR_1 | $-1 \geq \Delta SINR > -2$ | dB |
| DIFFSINR_2 | $-2 \geq \Delta SINR > -3$ | dB |
| DIFFSINR_3 | $-3 \geq \Delta SINR > -4$ | dB |
| DIFFSINR_4 | $-4 \geq \Delta SINR > -5$ | dB |
| DIFFSINR_5 | $-5 \geq \Delta SINR > -6$ | dB |
| DIFFSINR_6 | $-6 \geq \Delta SINR > -7$ | dB |
| DIFFSINR_7 | $-7 \geq \Delta SINR > -8$ | dB |
| DIFFSINR_8 | $-8 \geq \Delta SINR > -9$ | dB |
| DIFFSINR_9 | $-9 \geq \Delta SINR > -10$ | dB |

TABLE 6a-continued

| Reported value | Measured quantity value (difference in measured SINR from strongest SINR) | Unit |
|---|---|---|
| DIFFSINR_10 | $-10 \geq \Delta SINR > -11$ | dB |
| DIFFSINR_11 | $-11 \geq \Delta SINR > -12$ | dB |
| DIFFSINR_12 | $-12 \geq \Delta SINR > -13$ | dB |
| DIFFSINR_13 | $-13 \geq \Delta SINR > -14$ | dB |
| DIFFSINR_14 | $-14 \geq \Delta SINR$ | dB |
| DIFFSINR_15 | The corresponding L1-SINR measurement is <−23 dB | dB |

2) If the reported value of L1-SINR is <−8 dB, then the UE shall use Table 6b to calculate the reported value for a differential L1-SINR, where $\Delta SINR$ is the difference in measured L1-SINR from the strongest L1-SINR.

TABLE 6b

| Reported value | Measured quantity value (difference in measured SINR from strongest SINR) | Unit |
|---|---|---|
| DIFFSINR_0 | $0 \geq \Delta SINR > -1$ | dB |
| DIFFSINR_1 | $-1 \geq \Delta SINR > -2$ | dB |
| DIFFSINR_2 | $-2 \geq \Delta SINR > -3$ | dB |
| DIFFSINR_3 | $-3 \geq \Delta SINR > -4$ | dB |
| DIFFSINR_4 | $-4 \geq \Delta SINR > -5$ | dB |
| DIFFSINR_5 | $-5 \geq \Delta SINR > -6$ | dB |
| DIFFSINR_6 | $-6 \geq \Delta SINR > -7$ | dB |
| DIFFSINR_7 | $-7 \geq \Delta SINR > -8$ | dB |
| DIFFSINR_8 | $-8 \geq \Delta SINR > -9$ | dB |
| DIFFSINR_9 | $-9 \geq \Delta SINR > -10$ | dB |
| DIFFSINR_10 | $-10 \geq \Delta SINR > -11$ | dB |
| DIFFSINR_11 | $-11 \geq \Delta SINR > -12$ | dB |
| DIFFSINR_12 | $-12 \geq \Delta SINR > -13$ | dB |
| DIFFSINR_13 | $-13 \geq \Delta SINR > -14$ | dB |
| DIFFSINR_14 | $-14 \geq \Delta SINR > -15$ | dB |
| DIFFSINR_15 | $-15 \geq \Delta SINR$ | dB |

In one example, 4-bits are used for reported value of a differential L1-SINR and the step size is 2 dB. The UE is configured or preconfigured with a first threshold is 7 dB. The UE is configured to report N>1 CRI/SSBRI and corresponding L1-SINR or differential L1-SINR. Then the UE shall calculate reported value for a differential L1-SINR as follows.

1) If the reported value of L1-SINR is ≥7 dB, then UE shall use Table 7a to calculate the reported value for a differential L1-SINR, where $\Delta SINR$ is the difference in measured L1-SINR from the strongest L1-SINR.

TABLE 7a

| Reported value | Measured quantity value (difference in measured SINR from strongest SINR) | Unit |
|---|---|---|
| DIFFSINR_0 | $0 \geq \Delta SINR > -2$ | dB |
| DIFFSINR_1 | $-2 \geq \Delta SINR > -4$ | dB |
| DIFFSINR_2 | $-4 \geq \Delta SINR > -6$ | dB |
| DIFFSINR_3 | $-6 \geq \Delta SINR > -8$ | dB |
| DIFFSINR_4 | $-8 \geq \Delta SINR > -10$ | dB |
| DIFFSINR_5 | $-10 \geq \Delta SINR > -12$ | dB |
| DIFFSINR_6 | $-12 \geq \Delta SINR > -14$ | dB |
| DIFFSINR_7 | $-14 \geq \Delta SINR > -16$ | dB |

TABLE 7a-continued

| Reported value | Measured quantity value (difference in measured SINR from strongest SINR) | Unit |
|---|---|---|
| DIFFSINR_8 | $-16 \geq \Delta SINR > -18$ | dB |
| DIFFSINR_9 | $-18 \geq \Delta SINR > -20$ | dB |
| DIFFSINR_10 | $-20 \geq \Delta SINR > -22$ | dB |
| DIFFSINR_11 | $-22 \geq \Delta SINR > -24$ | dB |
| DIFFSINR_12 | $-24 \geq \Delta SINR > -26$ | dB |
| DIFFSINR_13 | $-26 \geq \Delta SINR > -28$ | dB |
| DIFFSINR_14 | $-28 \geq \Delta SINR$ | dB |
| DIFFSINR_15 | The corresponding L1-SINR measurement is <−23 dB | dB |

2) If the reported value of L1-SINR is <7 dB, then the UE shall use Table 7b to calculate the reported value for a differential L1-SINR, where $\Delta SINR$ is the difference in measured L1-SINR from the strongest L1-SINR.

TABLE 7b

| Reported value | Measured quantity value (difference in measured SINR from strongest SINR) | Unit |
|---|---|---|
| DIFFSINR_0 | $0 \geq \Delta SINR > -2$ | dB |
| DIFFSINR_1 | $-2 \geq \Delta SINR > -4$ | dB |
| DIFFSINR_2 | $-4 \geq \Delta SINR > -6$ | dB |
| DIFFSINR_3 | $-6 \geq \Delta SINR > -8$ | dB |
| DIFFSINR_4 | $-8 \geq \Delta SINR > -10$ | dB |
| DIFFSINR_5 | $-10 \geq \Delta SINR > -12$ | dB |
| DIFFSINR_6 | $-12 \geq \Delta SINR > -14$ | dB |
| DIFFSINR_7 | $-14 \geq \Delta SINR > -16$ | dB |
| DIFFSINR_8 | $-16 \geq \Delta SINR > -18$ | dB |
| DIFFSINR_9 | $-18 \geq \Delta SINR > -20$ | dB |
| DIFFSINR_10 | $-20 \geq \Delta SINR > -22$ | dB |
| DIFFSINR_11 | $-22 \geq \Delta SINR > -24$ | dB |
| DIFFSINR_12 | $-24 \geq \Delta SINR > -26$ | dB |
| DIFFSINR_13 | $-26 \geq \Delta SINR > -28$ | dB |
| DIFFSINR_14 | $-28 \geq \Delta SINR > -30$ | dB |
| DIFFSINR_15 | $-30 \geq \Delta SINR$ | dB |

Default Tx Beam for PUCCH/SRS

In the embodiment of the disclosure, the UE may report the following first UE capability indication information through a UE capability report: beamCorrespondenceWithoutUL-BeamSweeping=enabled. When reporting the first UE capability indication information, the UE has at least one of the following behaviors.

In an implementation, in the case that the UE reports the first UE capability indication information, if a higher layer parameter spatialRelationInfoToAddModList is not configured for the UE, the UE determines a CSI-RS resource or SSB based on a higher layer parameter pathlossReferenceRSs, and determines a configuration of spatial relation of a PUCCH resource based on the CSI-RS resource or SSB.

In an implementation, in the case that the UE reports the first UE capability indication information, if the higher layer parameter spatialRelationInfoToAddModList is configured for the UE and the UE does not receive an activation command for activating one spatial relation information for a PUCCH resource, the UE determines the configuration of the spatial relation of the PUCCH resource based on the spatial relation information with a lowest spatial relation information identifier.

In an implementation, in the case that the UE reports the first UE capability indication information, if the higher layer parameter spatialRelationInfoToAddModList is not configured for the UE, the UE determines the configuration of the spatial relation of the PUCCH resource based on a spatial domain transmission filter used to transmit an RACH msg1.

In an implementation, in the case that the UE reports the first UE capability indication information, if a higher layer parameter spatialRelationInfo is not configured for the UE, the UE determines a CSI-RS resource or SSB based on the higher layer parameter pathlossReferenceRSs, and determines a configuration of spatial relation of a SRS resource based on the CSI-RS resource or SSB.

In an implementation, in the case that the UE reports the first UE capability indication information, if the higher layer parameter spatialRelationInfo is not configured for the UE, the UE determines the configuration of the spatial relation of the SRS resource based on a SSB used to receive a Master Information Block (MIB).

In an implementation, in the case that the UE reports the first UE capability indication information, if the higher layer parameter spatialRelationInfo is not configured for the UE, the UE determines the configuration of the spatial relation of the SRS resource based on a spatial domain transmission filter used to transmit an RACH msg1.

In the embodiment of the disclosure, in the case that the UE does not report the first UE capability indication information, the UE has at least one of the following behaviors.

In an implementation, in the case that the UE does not report the first UE capability indication information, if a higher layer parameter spatialRelationInfoToAddModList is not configured for the UE, the UE determines a configuration of spatial relation of a PUCCH resource based on a first SRS resource. Here, the first SRS resource is a SRS resource with a lowest SRS resource identifier in a SRS resource set, and the SRS resource set is used for beam management. Alternatively, the first SRS resource is the SRS resource with the lowest SRS resource identifier in the first SRS resource set, and the first SRS resource set is a SRS resource set with a lowest SRS resource set identifier among multiple SRS resource sets. The multiple SRS resource sets are used for beam management.

In an implementation, in the case that the UE does not report the first UE capability indication information, if the higher layer parameter spatialRelationInfoToAddModList is configured for the UE and the UE does not receive an activation command for activating one spatial relation information for a PUCCH resource, the UE determines the configuration of the spatial relation of the PUCCH resource based on the spatial relation information with a lowest spatial relation information identifier.

In an implementation, in the case that the UE does not report the first UE capability indication information, if a higher layer parameter spatialRelationInfo is not configured for the UE, the UE determines a configuration of spatial relation of a SRS resource based on a first SRS resource. Here, the first SRS resource is a SRS resource with a lowest SRS resource identifier in a SRS resource set, and the SRS resource set is used for beam management. Alternatively, the first SRS resource is the SRS resource with the lowest SRS resource identifier in the first SRS resource set, and the first SRS resource set is a SRS resource set with a lowest SRS resource set identifier among multiple SRS resource sets. The multiple SRS resource sets are used for beam management.

In an implementation, in the case that the UE does not report the first UE capability indication information, if the higher layer parameter spatialRelationInfo is not configured for the UE, the UE determines the configuration of the spatial relation of the SRS resource based on a spatial domain transmission filter used to transmit an RACH msg1.

In an example, if a UE reports beamCorrespondenceWithoutUL-BeamSweeping=enabled in UE capability reporting, i.e., the UE reports that the UE supports Frequency Range 2 (FR2) beam correspondence, then the UE can be requested to follow one or more of the following behaviors.

For a PUCCH resource, if higher layer parameter spatialRelationInfoToAddModList is not provided to the UE, the UE shall use the CSI-RS resource or SS/PBCH blocks configured in a first entry of the higher layer parameter pathlossReferenceRSs configured for the PUCCH as the spatialrelationinfo for the PUCCH resource.
  i) If pathlossReferenceRSs is not provided, the UE shall assume the spatial setting for the PUCCH resource is the SS/PBCH block used to receive MIB.

For a PUCCH resource, if higher layer parameter spatialRelationInfoToAddModList is provided to the UE and the UE does not receive an activation command for activating one spatialRelationInfo for the PUCCH resource:
  i) if the UE is provided multiple values for PUCCH-SpatialRelationInfo, the UE determines a spatial setting for the PUCCH resource to be PUCCH-SpatialRelationInfold identified by the lowest pucch-SpatialRelationInfold.

For a PUCCH resource, if higher layer parameter PUCCH-SpatialRelationInfo is not provided to the UE, the UE can assume the configuration of spatial relation of the PUCCH resource to be the spatial domain transmission filter used to transmit the RACH msg1 successfully in the most recent RACH transmission.

For an SRS resource, if higher layer parameter spatialRelationInfo is not provided to the UE:
  i) if higher layer parameter pathlossReferenceRS is provided to the SRS resource set that the SRS resource is configured in, the UE shall assume the configuration of spatial relation of the SRS resource to be the CSI-RS resource or SS/PBCH block provided in pathlossReferenceRS.
  ii) if higher layer parameter pathlossReferenceRS is not provided to the SRS resource set that the SRS resource is configured in, the UE shall assume the configuration of spatial relation of the SRS resource to be the SS/PBCH block used to receive MIB.
  iii) for the SRS resource, the UE can assume the configuration of spatial relation of the SRS resource to be the spatial domain transmission filter used to transmit the RACH msg1 successfully in the most recent RACH transmission.

In an example, if a UE does NOT report beamCorrespondenceWithoutUL-BeamSweeping=enabled in UE capability reporting, i.e., the UE does not supports FR2 beam correspondence, then the UE can be requested to follow one or more of the following behaviors.

For a PUCCH resource, if higher layer parameter spatialRelationInfoToAddModList is not provided,
  i) Method 1: the UE can assume the configuration of spatial relation of the PUCCH resource is a first SRS resource.
    Alt 1: the first SRS resource is the SRS resource with lowest SRS resource ID, srs-ResourceId, among all the SRS resources contained in SRS resource set(s) configured with the higher layer parameter usage is set to 'beamManagement'.
    Alt2: the first SRS resource is the SRS resource with lowest SRS resource ID, srs-ResourceId, among all the SRS resources contained in SRS resource set with lowest SRS resource set ID, srs-ResourceSetId, configured with the higher layer parameter usage is set to 'beamManagement'.

ii) Method 2: the UE can assume the configuration of spatial relation of the PUCCH resource to be the spatial domain transmission filter used to transmit the RACH msg1 successfully in the most recent RACH transmission.

For a PUCCH resource, if higher layer parameter spatial-RelationInfoToAddModList is provided to the UE and the UE does not receive an activation command for activating one spatialRelationInfo for the PUCCH resource:

i) If the UE is provided multiple values for PUCCH-SpatialRelationInfo, the UE determines a spatial setting for the PUCCH resource to be PUCCH-SpatialRelationInfo identified by the lowest pucch-SpatialRelationInfoId.

For an SRS resource in an SRS resource set with higher layer parameter usage that is not set to 'beamManagement', if higher layer parameter spatialRelationInfo is not provided to the UE:

i) Method 1: the UE can assume the configuration of spatial relation of the SRS resource is a first SRS resource.
  Alt 1: the first SRS resource is the SRS resource with lowest SRS resource ID, srs-ResourceId, among all the SRS resources contained in SRS resource set(s) configured with the higher layer parameter usage is set to 'beamManagement'.
  Alt2: the first SRS resource is the SRS resource with lowest SRS resource ID, srs-ResourceId, among all the SRS resources contained in SRS resource set with lowest SRS resource set ID, srs-ResourceSetId, configured with the higher layer parameter usage is set to 'beamManagement'.

ii) Method2: the UE can assume the configuration of spatial relation of the SRS resource to be the spatial domain transmission filter used to transmit the RACH msg1 successfully in the most recent RACH transmission.

With the above technical solutions, for the first SCell, if the first SCell is not configured with the candidate new beam RSs, the UE determines the candidate new beam RSs for the first SCell based on the CSI-RS resources and/or SSBs in the target cell which is in the same frequency band as the first SCell, thereby achieving the beam failure recovery for the first SCell. The network does not need to separately configure the candidate new beam RSs for the first SCell, and signaling overhead is saved.

Figure 3:
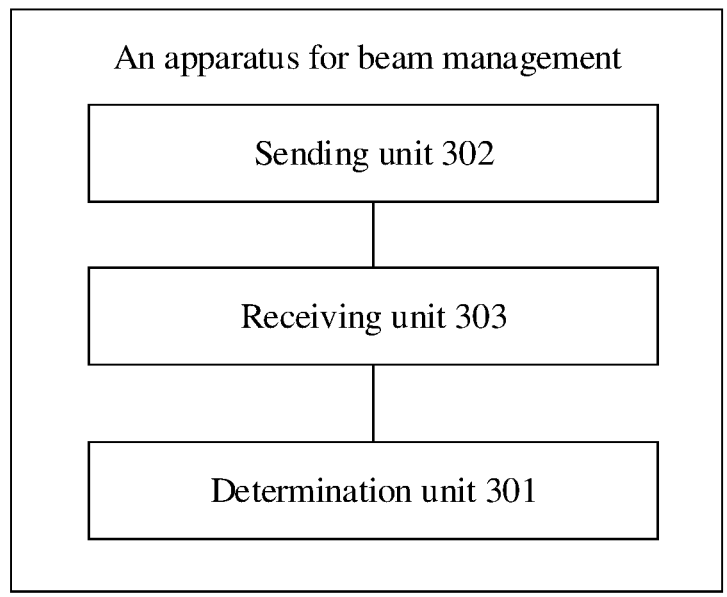
FIG. 3 is a block diagram of an apparatus for beam management according to an embodiment of the disclosure.

FIG. 3 is a block diagram of an apparatus for beam management according to an embodiment of the disclosure. As shown in FIG. 3, the apparatus for beam management includes a determination unit 301.

The determination unit 301 is configured to, in the case that a UE is not configured with candidate new beam RSs for a first SCell, determine CSI-RS resources and/or SSBs in a target cell as the candidate new beam RSs for the first SCell. The candidate new beam RSs are used for a beam failure recovery for the first SCell.

The first SCell is in a same frequency band as the target cell.

In an implementation, the target cell is a PCell or PScell in a first cell group, and the first cell group refers to a cell group to which the first SCell belongs.

The determination unit 301 is configured to determine all SSBs on the PCell or the PScell as the candidate new beam RSs for the first SCell.

In an implementation, the target cell is a PCell or PScell in a first cell group, and the first cell group refers to a cell group to which the first SCell belongs.

The determination unit 301 is configured to determine CSI-RS resources and/or SSBs configured for the PCell or PSCell as the candidate new beam RSs for the first SCell.

In an implementation, the target cell is a second Scell in a first cell group, and the first cell group refers to a cell group to which the first SCell belongs.

The determination unit 301 is configured to determine CSI-RS resources and/or SSBs configured for the second Scell as the candidate new beam RSs for the first SCell.

In an implementation, if the UE is configured with CSI-RS resources and/or SSBs for one SCell, the second SCell is the one SCell.

Alternatively, if the UE is configured with CSI-RS resources and/or SSBs for multiple SCells, the second SCell is the SCell with lowest serving cell index among the multiple SCells.

In an implementation, the determination unit 301 is configured to, when the first SCell is in the same frequency band as a PCell or PSCell in a first cell group, determine all SSBs on the PCell or PSCell as the candidate new beam RSs for the first SCell. The first cell group refers to a cell group to which the first SCell belongs.

In an implementation, the determination unit 301 is configured to, when the first SCell is in the same frequency band as a PCell or PSCell in a first cell group, determine CSI-RS resources and/or SSBs configured for the PCell or PSCell as the candidate new beam RSs for the first SCell. The first cell group refers to a cell group to which the first SCell belongs.

In an implementation, when the first SCell is in the same frequency band as a PCell or PSCell in a first cell group, the determination unit 301 is configured to perform the following operations.

When the UE is configured with CSI-RS resources and/or SSBs for the PCell or PScell, the CSI-RS resources and/or SSBs configured for the PCell or PScell are determined as the candidate new beam RSs for the first SCell.

Otherwise, when the UE is not configured with CSI-RS resources and/or SSBs for the PCell or PScell, all SSBs on the PCell or PScell are determined as the candidate new beam RSs for the first SCell.

The first cell group refers to a cell group to which the first SCell belongs.

In an implementation, the determination unit 301 is configured to perform the following operations.

When the UE is configured with CSI-RS resources and/or SSBs for multiple SCells, at least one of the multiple SCells is in the same frequency band as the first SCell, and the multiple SCells and the first SCell belong to the same cell group, CSI-RS resources and/or SSBs for the SCell with the lowest serving cell index among the at least one SCell are determined as the candidate new beam RSs for the first SCell.

When the UE is configured with CSI-RS resources and/or SSBs for a PCell or PScell, the first SCell is in the same frequency band as the PCell or PSCell in a first cell group, and the PCell or PScell belongs to the same cell group as the first SCell, CSI-RS resource and/or SSBs configured for the PCell or PScell are determined as the candidate new beam RSs for the first SCell. Otherwise, when the UE is not configured with CSI-RS resources and/or SSBs for the PCell or PScell, the first SCell is in the same frequency band as the PCell or PSCell in the first cell group, and the PCell or PScell belongs to the same cell group as the first SCell, all SSBs on the PCell or PScell are determined as the candidate new beam RSs for the first SCell.

In an implementation, the apparatus further includes a sending unit 302 and a receiving unit 303.

The sending unit 302 is configured to send a MAC CE message for BFRQ to the first SCell. The MAC CE message is carried in a first PUSCH at slot n. The first PUSCH corresponds to a first HARQ process number.

The receiving unit 303 is configured to monitor a first DCI in a first time window. The first DCI is used for scheduling a PUSCH corresponding to the first HARQ process number.

The determination unit 301 is further configured to determine that beam failure recovery for the first SCell is completed when the first DCI is not received within the first time window.

In an implementation, the first time window is started from slot n+1.

In an implementation, the apparatus further includes a reporting unit configured to report N reference signal resource indicators, and report L1-SINR corresponding to each reference signal resource indicator in the N reference signal resource indicators, where N is a positive integer.

In an implementation, in the case of N>1, the reporting unit is further configured to report L1-SINR for a first reference signal resource indicator in the N reference signal resource indicators, and report differential L1-SINR of L1-SINR for each reference signal resource indicator in N−1 reference signal resource indicators other than the first reference signal resource indicator in the N reference signal resource indicators relative to a reference SINR.

In an implementation, the L1-SINR for the first reference signal resource indicator among the N reference signal resource indicators has a maximum value.

In an implementation, the reference SINR is the L1-SINR for the first reference signal resource indicator.

In an implementation, in a case where the L1-SINR for the first reference signal resource indicator is greater than or equal to a first threshold, the reference SINR is the first threshold.

In an implementation, in a case where the L1-SINR for the first reference signal resource indicator is less than a second threshold, the reference SINR is the second threshold.

In an implementation, a reported value of the L1-SINR for the first reference signal resource indicator is characterized by M1 bits. The reported value of the L1-SINR for the first reference signal resource indicator is determined based on a range in which a measured quantity value of the L1-SINR for the first reference signal resource indicator is located. M1 is a positive integer.

In an implementation, a reported value of the differential L1-SINR for each reference signal resource indicator in N−1 reference signal resource indicators is characterized by M2 bits. The reported value of the differential L1-SINR for the reference signal resource indicator is determined based on a range in which a measured quantity value of the differential L1-SINR for the reference signal resource indicator is located. M2 is a positive integer.

The measured quantity value of the differential L1-SINR for the reference signal resource indicator refers to a difference of a measured quantity value of the L1-SINR for the reference signal resource indicator relative to the reference SINR.

In an implementation, the reference signal resource indicator includes CRI and/or SSBRI.

In an implementation, the determination unit 301 is further configured to, in the case that the UE reports a first UE capability indication information, if a higher layer parameter spatialRelationInfoToAddModList is not configured for the UE, determine a CSI-RS resource or SSB based on a higher layer parameter pathlossReferenceRSs, and determine a configuration of spatial relation of a PUCCH resource based on the CSI-RS resource or SSB.

In an implementation, the determination unit 301 is further configured to, in the case that the UE reports the first UE capability indication information, if the higher layer parameter spatialRelationInfoToAddModList is configured for the UE and the UE does not receive an activation command for activating one spatial relation information for a PUCCH resource, determine the configuration of the spatial relation of the PUCCH resource based on the spatial relation information with a lowest spatial relation information identifier.

In an implementation, the determination unit 301 is further configured to, in the case that the UE reports the first UE capability indication information, if the higher layer parameter spatialRelationInfoToAddModList is not configured for the UE, determine the configuration of the spatial relation of the PUCCH resource based on a spatial domain transmission filter used to transmit an RACH msg1.

In an implementation, the determination unit 301 is further configured to, in the case that the UE reports the first UE capability indication information, if a higher layer parameter spatialRelationInfo is not configured for the UE, determine a CSI-RS resource or SSB based on the higher layer parameter pathlossReferenceRSs, and determine a configuration of spatial relation of a SRS resource based on the CSI-RS resource or SSB.

In an implementation, the determination unit 301 is further configured to, in the case that the UE reports the first UE capability indication information, if the higher layer parameter spatialRelationInfo is not configured for the UE, determine the configuration of the spatial relation of the SRS resource based on a SSB used to receive a MIB.

In an implementation, the determination unit 301 is further configured to, in the case that the UE reports the first UE capability indication information, if the higher layer parameter spatialRelationInfo is not configured for the UE, determine the configuration of the spatial relation of the SRS resource based on a spatial domain transmission filter used to transmit an RACH msg1.

In an implementation, the determination unit 301 is further configured to, in the case that the UE does not report the first UE capability indication information, if a higher layer parameter spatialRelationInfoToAddModList is not configured for the UE, determine a configuration of spatial relation of a PUCCH resource based on a first SRS resource.

In an implementation, the determination unit 301 is further configured to, in the case that the UE does not report the first UE capability indication information, if the higher layer parameter spatialRelationInfoToAddModList is configured for the UE and the UE does not receive an activation command for activating one spatial relation information for a PUCCH resource, determine the configuration of the spatial relation of the PUCCH resource based on the spatial relation information with a lowest spatial relation information identifier.

In an implementation, the determination unit 301 is further configured to, in the case that the UE does not report the first UE capability indication information, if a higher layer parameter spatialRelationInfo is not configured for the UE, determine a configuration of spatial relation of a SRS resource based on a first SRS resource.

In an implementation, the determination unit 301 is further configured to, in the case that the UE does not report the first UE capability indication information, if the higher layer parameter spatialRelationInfo is not configured for the UE, determine the configuration of the spatial relation of the SRS resource based on a spatial domain transmission filter used to transmit an RACH msg1.

In an implementation, the first SRS resource is a SRS resource with a lowest SRS resource identifier in a SRS resource set, and the SRS resource set is used for beam management.

In an implementation, the first SRS resource is the SRS resource with the lowest SRS resource identifier in the first SRS resource set, the first SRS resource set is a SRS resource set with a lowest SRS resource set identifier among multiple SRS resource sets, and the multiple SRS resource sets are used for beam management.

Those skilled in the art will appreciate that functions implemented by each unit in the apparatus for beam management may be understood with reference to related descriptions about the method for beam management.

Figure 4:
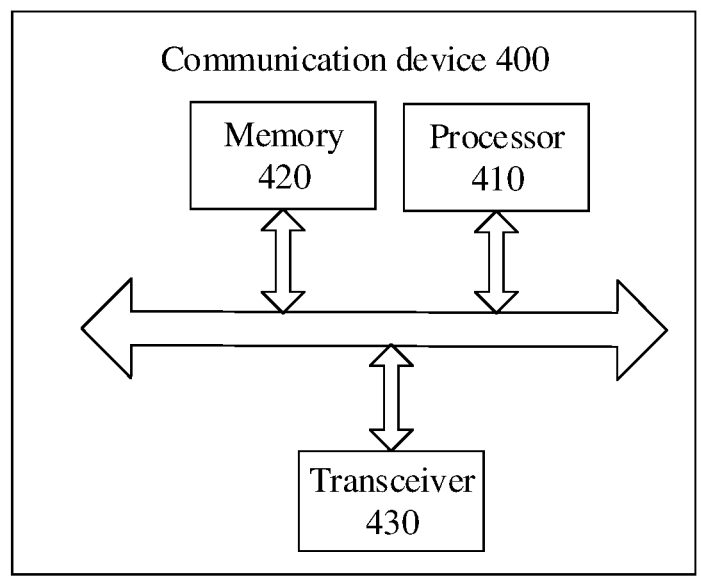
FIG. 4 is a structural diagram of a communication device according to an embodiment of the disclosure.

FIG. 4 is a structural diagram of a communication device 400 according to an embodiment of the present disclosure. The communication device may be a UE, or may be a network device. The communication device 400 as illustrated in FIG. 4 includes a processor 410 configured to call and execute computer programs in a memory to perform the methods in the embodiments of the present disclosure.

Optionally, as illustrated in FIG. 4, the communication device 400 may further include a memory 420. The processor 410 may be configured to call and execute the computer programs stored in the memory 420 to perform the methods in the embodiments of the present disclosure.

Here, the memory 420 may be a separate device independent of the processor 410, or may be integrated into the processor 410.

Optionally, as illustrated in FIG. 4, the communication device 400 may further include a transceiver 430. The processor 410 may control the transceiver 430 to perform communication with another device, so as to transmit information or data to the another device or receive information or data from the another device.

Here, the transceiver 430 may include a transmitter and a receiver. The transceiver 430 may further include antennas, and the number of antennas may be one or more.

Optionally, the communication device 400 may be a network device in the embodiments of the present disclosure. Moreover, the communication device 400 may be configured to implement the corresponding processes implemented by the network device in various methods in the embodiments of the present disclosure. For simplicity, details are not described herein again.

Optionally, the communication device 400 may be a mobile terminal/UE in the embodiments of the present disclosure. Moreover, the communication device 400 may be configured to implement the corresponding processes implemented by the mobile terminal/UE in various methods in the embodiments of the present disclosure. For simplicity, details are not described herein again.

Figure 5:
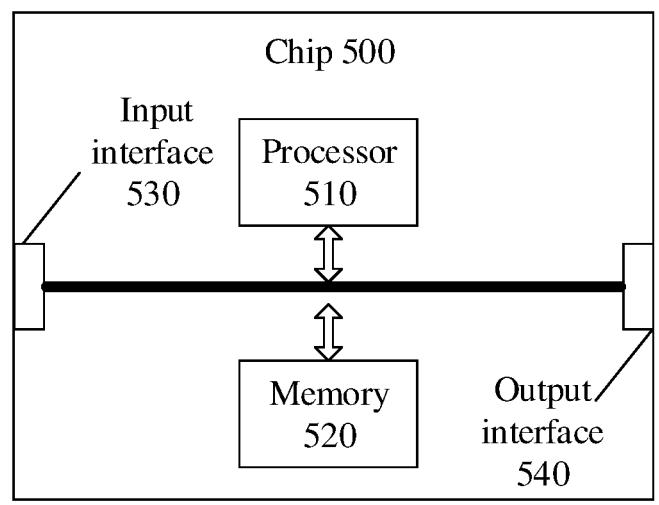
FIG. 5 is a structural diagram of a chip according to an embodiment of the disclosure.

FIG. 5 is a structural diagram of a chip according to an embodiment of the present disclosure. As illustrated in FIG. 5, the chip 500 includes a processor 510 configured to call and execute computer programs in a memory to perform the methods in the embodiments of the present disclosure.

Optionally, as illustrated in FIG. 5, the chip 500 may further include a memory 520. The processor 510 may be configured to call and execute the computer programs stored in the memory 520 to perform the methods in the embodiments of the present disclosure.

Here, the memory 520 may be a separate device independent of the processor 510, or may be integrated into the processor 510.

Optionally, the chip 500 may further include an input interface 530. The processor 510 may control the input interface 530 to communicate with another device or chip, so as to obtain information or data from the another device or chip.

Optionally, the chip 500 may further include an output interface 540. The processor 510 may control the output interface 540 to communicate with another device or chip, so as to output information or data to the another device or chip.

Optionally, the chip may be applied to the network device in the embodiments of the present disclosure, and the chip may implement the corresponding processes implemented by the network device in various methods in the embodiments of the present disclosure. For simplicity, details are not described herein again.

Optionally, the chip may be applied to the mobile terminal/UE in the embodiments of the present disclosure, and the chip may implement the corresponding processes implemented by the mobile terminal/UE in various methods in the embodiments of the present disclosure. For simplicity, details are not described herein again.

It should be understood that the chip in the embodiments of the present disclosure may also be called as a system-level chip, a system chip, a chip system or a system-on-chip.

Figure 6:
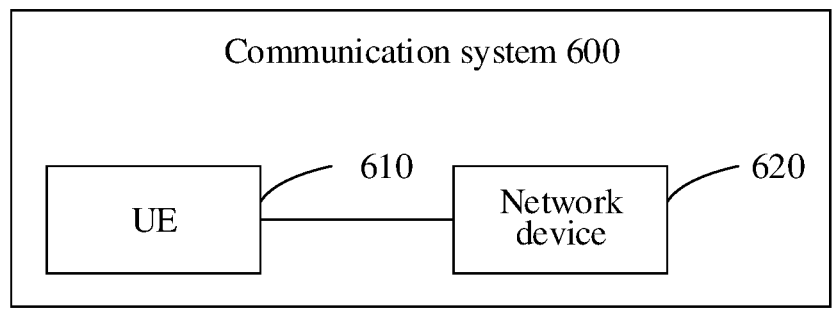
FIG. 6 is a block diagram of a communication system according to an embodiment of the disclosure.

FIG. 6 is a block diagram of a communication system 600 according to an embodiment of the present disclosure. As illustrated in FIG. 6, the communication system 600 includes a UE 610 and a network device 620.

Here, the UE 610 may be configured to perform the corresponding functions implemented by the UE in the above methods. The network device 620 may be configured to perform the corresponding functions implemented by the network device in the above methods. For simplicity, details are not described herein again.

It should be understood that the processor in the embodiments of the disclosure may be an integrated circuit chip and has a signal processing capability. In the implementation process, each operation in the foregoing method embodiments may be completed by an integrated logic circuit in a form of hardware in a processor or instructions in a form of software in a processor. The above processor may be a general-purpose processor, a Digital Signal Processor (DSP), an Application Specific Integrated Circuit (ASIC), a Field Programmable Gate Array (FPGA) or another Programming logic devices, a discrete gate or transistor logic device, a discrete hardware component, or the like. Various methods, operations, and logical blocks disclosed in the embodiments of the present disclosure can be implemented or executed. A general-purpose processor may be a microprocessor or the processor may be any conventional processor or the like. The operations in the methods disclosed in combination with the embodiments of the present disclosure may be directly implemented by a decoding processor in hardware form, or may be implemented by a combination of hardware and software modules in the decoding processor. The software modules may be located in a mature storage medium in the art, such as a Random Access Memory (RAM), a flash memory, a Read-Only Memory (ROM), a Programmable Read-Only Memory (PROM), an Erasable Programmable Read-Only Memory (EPROM), an Electrically Erasable Programmable Read-Only Memory (EEPROM), a register, and the like. The storage medium is located in a memory, and the processor reads the information in the memory and completes the operations in the foregoing methods in combination with the hardware of the processor.

It should be understood that the memory in the embodiments of the present disclosure may be a volatile memory or a non-volatile memory, or may include the volatile memory and the non-volatile memory. The non-volatile memory may be a ROM, a PROM, an EPROM, EEPROM or a flash memory, or the like. The volatile memory may be a RAM, which is used as an external cache. By way of example, but not limitation, many forms of RAMs are available, such as a Static Random Access Memory (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described herein is intended to include, but is not limited to, these and any other suitable types of memory.

The embodiments of the present disclosure further provide a computer-readable storage medium for storing computer programs.

Optionally, the computer-readable storage medium may be applied to the network device in the embodiments of the present disclosure, and the computer programs cause a computer to execute the corresponding processes implemented by the network device in each method in the embodiments of the present disclosure. For simplicity, details are not described herein again.

Optionally, the computer-readable storage medium may be applied to the mobile terminal/UE in the embodiments of the present disclosure, and the computer programs cause a computer to execute the corresponding processes implemented by the mobile terminal/UE in each method in the embodiments of the present disclosure. For simplicity, details are not described herein again.

The embodiments of the present disclosure further provide a computer program product including computer program instructions.

Optionally, the computer program product may be applied to the network device in the embodiments of the present disclosure, and the computer program instructions cause a computer to execute the corresponding processes implemented by the network device in each method in the embodiments of the present disclosure. For simplicity, details are not described herein again.

Optionally, the computer program product may be applied to the mobile terminal/UE in the embodiments of the present disclosure, and the computer program instructions cause a computer to execute the corresponding processes implemented by the mobile terminal/UE in each method in the embodiments of the present disclosure. For simplicity, details are not described herein again.

The embodiments of the present disclosure further provide a computer program.

Optionally, the computer program may be applied to the network device in the embodiments of the present disclosure. When the computer program is run on a computer, the computer is caused to execute the corresponding processes implemented by the network device in each method in the embodiments of the present disclosure. For simplicity, details are not described herein again.

Optionally, the computer program may be applied to the mobile terminal/UE in the embodiments of the present disclosure. When the computer program is run on a computer, the computer is caused to execute the corresponding processes implemented by the mobile terminal/UE in each method in the embodiments of the present disclosure. For simplicity, details are not described herein again.

A person of ordinary skill in the art may be aware that, units and algorithm operations in each example described in combination with the embodiments of in present disclosure may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that for the purpose of convenient and brief description, detailed working processes of the foregoing system, device, and unit may refer to corresponding processes in the foregoing method embodiments, and details are not described herein again.

In the several embodiments provided in the present disclosure, it should be understood that the disclosed system, device, and method may be implemented in other manners. For example, the described device embodiments are merely examples. For example, the unit division is merely logical function division. During actual implementation, there may be another division manner. For example, a plurality of units or components may be combined or integrated into another system, or some features may be ignored or not performed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions in the embodiments.

In addition, each functional unit in each embodiment of the disclosure may be integrated into a processing unit, each unit may also serve as an independent unit and two or more than two units may also be integrated into a unit.

When being implemented in form of software functional module and sold or used as an independent product, the functions in the embodiments of the disclosure may be stored in a computer-readable storage medium. Based on such an understanding, the technical solutions in the embodiments of the disclosure substantially or parts making contributions to the conventional art may be embodied in form of software product, and the computer software product is stored in a storage medium, including a plurality of instructions used to enable a computer device (which may be a personal computer, a server, a network device or the like) to execute all or part of the operations in the method in each embodiment of the disclosure. The storage medium includes: various media capable of storing program codes such as a U disk, a mobile hard disk, a Read Only Memory (ROM), a RAM, a magnetic disk or an optical disk.

Described above are merely specific embodiments of the disclosure, and are not intended to limit the scope of protection of the disclosure. Any variations or replacements apparent to those skilled in the art within the technical scope disclosed by the disclosure shall fall within the scope of protection of the disclosure. Therefore, the scope of protection of the present disclosure shall be subject to the scope of protection of the claims.

What is claimed is:

1. A method for beam management, comprising:

sending, by User Equipment (UE), a Media Access Control (MAC) Control Element (CE) message for Beam Failure Recovery reQuest (BFRQ) to a first Secondary Cell (SCell), wherein the MAC CE message is carried in a first Physical Uplink Shared Channel (PUSCH) at slot n, and the first PUSCH corresponds to a first Hybrid Automatic Repeat reQuest (HARQ) process number;

monitoring, by the UE, a first Downlink Control Information (DCI) in a first time window, wherein the first DCI is used for scheduling the first PUSCH corresponding to the first HARQ process number; and in response to not receiving the first DCI within the first time window, determining, by the UE, that beam failure recovery for the first SCell is completed, and assuming, by the UE, that a Physical Downlink Control Channel (PDCCH) is quasi-collocated with a Channel State Information Reference Signal (CSI-RS) resource or Synchronization Signal/Physical Broadcast Channel Block (SS/PBCH Block, SSB) that is identified by a candidate beam Reference Signal (RS) Identity (ID) carried in the MAC CE message, wherein the method further comprises:

reporting, by the UE, N reference signal resource indicators, and reporting L1-Signal to Interference plus Noise Ratio (SINR) corresponding to each reference signal resource indicator in the N reference signal resource indicators, where N is a positive integer, wherein in the case of N>1, reporting L1-SINR corresponding to each reference signal resource indicator in the N reference signal resource indicators comprises:

reporting L1-SINR for a first reference signal resource indicator in the N reference signal resource indicators, and reporting differential L1-SINR for each reference signal resource indicator in N−1 reference signal resource indicators other than the first reference signal resource indicator in the N reference signal resource indicators relative to a reference SINR, wherein 4 bits are used for reporting the differential L1-SINR for each reference signal resource indicator in N−1 reference signal resource indicators, with a step size of the differential L1-SINR equal to 1 dB and a mapping method for a reported value of the differential L1-SINR defined as the following table:

| Reported value | Measured quantity value(difference in measured SINR from strongest SINR) | Unit |
| --- | --- | --- |
| DIFFSINR_0 | $0 \geq \Delta SINR > -1$ | dB |
| DIFFSINR_1 | $-1 \geq \Delta SINR > -2$ | dB |
| DIFFSINR_2 | $-2 \geq \Delta SINR > -3$ | dB |
| DIFFSINR_3 | $-3 \geq \Delta SINR > -4$ | dB |
| DIFFSINR_4 | $-4 \geq \Delta SINR > -5$ | dB |
| DIFFSINR_5 | $-5 \geq \Delta SINR > -6$ | dB |
| DIFFSINR_6 | $-6 \geq \Delta SINR > -7$ | dB |
| DIFFSINR_7 | $-7 \geq \Delta SINR > -8$ | dB |
| DIFFSINR_8 | $-8 \geq \Delta SINR > -9$ | dB |
| DIFFSINR_9 | $-9 \geq \Delta SINR > -10$ | dB |
| DIFFSINR_10 | $-10 \geq \Delta SINR > -11$ | dB |
| DIFFSINR_11 | $-11 \geq \Delta SINR > -12$ | dB |
| DIFFSINR_12 | $-12 \geq \Delta SINR > -13$ | dB |
| DIFFSINR_13 | $-13 \geq \Delta SINR > -14$ | dB |
| DIFFSINR_14 | $-14 \geq \Delta SINR > -15$ | dB |
| DIFFSINR_15 | $-15 \geq \Delta SINR$ | dB. |

2. The method of claim 1, further comprising:

in response to the candidate beam RS ID being carried in the MAC CE message, assuming, by the UE, that the PDCCH is quasi-collocated with the CSI-RS or SSB) that is identified by the candidate beam RS ID carried in the MAC CE message starting from a first moment until a second moment, wherein the first moment is a slot when the UE declares the beam failure recovery for the first SCell is completed, and the second moment is a moment when the UE receives at least one of: a Transmission Configuration Indicator (TCI) state activation command, a TCI state addition list, or a TCI state release list for the first SCell.

3. The method of claim 1, wherein the first time window is started from slot n+1.

4. The method of claim 1, wherein the reference SINR is the L1-SINR for the first reference signal resource indicator, and the L1-SINR for the first reference signal resource indicator among the N reference signal resource indicators has a maximum value.

5. The method of claim 1, wherein the reference signal resource indicator comprises at least one of: CSI-RS resource indicator (CRI) or SS/PBCH block resource indicator (SSBRI).

6. An apparatus for beam management, comprising:

a transceiver;

a processor; and a memory for storing a computer program, wherein the processor is configured to execute the computer program stored in the memory to:

control the transceiver to send a Media Access Control (MAC) Control Element (CE) message for Beam Failure Recovery reQuest (BFRQ) to a first Secondary Cell (SCell), wherein the MAC CE message is carried in a first Physical Uplink Shared Channel (PUSCH) at slot n, and the first PUSCH corresponds to a first Hybrid Automatic Repeat reQuest (HARQ) process number;

control the transceiver to monitor a first Downlink Control Information (DCI) in a first time window, wherein the first DCI is used for scheduling the first PUSCH corresponding to the first HARQ process number; and in response to not receiving the first DCI within the first time window, determine that beam failure recovery for the first SCell is completed, and assume that a Physical Downlink Control Channel (PDCCH) is quasi-collocated with a Channel State Information Reference Signal (CSI-RS) resource or Synchronization Signal/Physical Broadcast Channel Block (SS/PBCH Block, SSB) that is identified by a candidate beam Reference Signal (RS) Identity (ID) carried in the MAC CE message, wherein the processor is further configured to:
control the transceiver to report N reference signal resource indicators, and report L1-Signal to Interference plus Noise Ratio (SINR) corresponding to each reference signal resource indicator in the N reference signal resource indicators, where N is a positive integer,
wherein in the case of N>1, the processor is specifically configured to:
control the transceiver to report L1-SINR for a first reference signal resource indicator in the N reference signal resource indicators, and report differential L1-SINR for each reference signal resource indicator in N−1 reference signal resource indicators other than the first reference signal resource indicator in the N reference signal resource indicators relative to a reference SINR,
wherein 4 bits are used for reporting the differential L1-SINR for each reference signal resource indicator in N−1 reference signal resource indicators, with a step size of the differential L1-SINR equal to 1 dB and a mapping method for a reported value of the differential L1-SINR defined as the following table:

| Reported value | Measured quantity value(difference in measured SINR from strongest SINR) | Unit |
| --- | --- | --- |
| DIFFSINR_0 | $0 \geq \Delta SINR > -1$ | dB |
| DIFFSINR_1 | $-1 \geq \Delta SINR > -2$ | dB |
| DIFFSINR_2 | $-2 \geq \Delta SINR > -3$ | dB |
| DIFFSINR_3 | $-3 \geq \Delta SINR > -4$ | dB |
| DIFFSINR_4 | $-4 \geq \Delta SINR > -5$ | dB |
| DIFFSINR_5 | $-5 \geq \Delta SINR > -6$ | dB |
| DIFFSINR_6 | $-6 \geq \Delta SINR > -7$ | dB |
| DIFFSINR_7 | $-7 \geq \Delta SINR > -8$ | dB |
| DIFFSINR_8 | $-8 \geq \Delta SINR > -9$ | dB |
| DIFFSINR_9 | $-9 \geq \Delta SINR > -10$ | dB |
| DIFFSINR_10 | $-10 \geq \Delta SINR > -11$ | dB |
| DIFFSINR_11 | $-11 \geq \Delta SINR > -12$ | dB |
| DIFFSINR_12 | $-12 \geq \Delta SINR > -13$ | dB |
| DIFFSINR_13 | $-13 \geq \Delta SINR > -14$ | dB |
| DIFFSINR_14 | $-14 \geq \Delta SINR > -15$ | dB |
| DIFFSINR_15 | $-15 \geq \Delta SINR$ | dB. |

7. The apparatus of claim 6, wherein the processor is further configured to:
in response to the candidate beam RS ID being carried in the MAC CE message, assume that the PDCCH is quasi-collocated with the CSI-RS) resource or SSB) that is identified by the candidate beam RS ID carried in the MAC CE message starting from a first moment until a second moment, wherein the first moment is a slot when User Equipment (UE) declares the beam failure recovery for the first SCell is completed, and the second moment is a moment when the UE receives at least one of: a Transmission Configuration Indicator (TCI) state activation command, a TCI state addition list, or a TCI state release list for the first SCell.

8. The apparatus of claim 6, wherein the first time window is started from slot n+1.

9. The apparatus of claim 6, wherein the reference SINR is the L1-SINR for the first reference signal resource indicator, and the L1-SINR for the first reference signal resource indicator among the N reference signal resource indicators has a maximum value.

10. The apparatus of claim 6, wherein the reference signal resource indicator comprises at least one of: CSI-RS resource indicator (CRI) or SS/PBCH block resource indicator (SSBRI).

11. A non-transitory computer-readable storage medium having stored thereon a computer program which, when being executed by a computer, enables the computer to execute a method for beam management, the method comprising:
sending a Media Access Control (MAC) Control Element (CE) message for Beam Failure Recovery reQuest (BFRQ) to a first Secondary Cell (SCell), wherein the MAC CE message is carried in a first Physical Uplink Shared Channel (PUSCH) at slot n, and the first PUSCH corresponds to a first Hybrid Automatic Repeat reQuest (HARQ) process number;
monitoring a first Downlink Control Information (DCI) in a first time window, wherein the first DCI is used for scheduling the first PUSCH corresponding to the first HARQ process number; and
in response to not receiving the first DCI within the first time window, determining that beam failure recovery for the first SCell is completed, and assuming that a Physical Downlink Control Channel (PDCCH) is quasi-collocated with a Channel State Information Reference Signal (CSI-RS) resource or Synchronization Signal/Physical Broadcast Channel Block (SS/PBCH Block, SSB) that is identified by a candidate beam Reference Signal (RS) Identity (ID) carried in the MAC CE message,
wherein the method further comprises:
reporting, by the UE, N reference signal resource indicators, and reporting L1-Signal to Interference plus Noise Ratio (SINR) corresponding to each reference signal resource indicator in the N reference signal resource indicators, where N is a positive integer,
wherein in the case of N>1, reporting L1-SINR corresponding to each reference signal resource indicator in the N reference signal resource indicators comprises:
reporting L1-SINR for a first reference signal resource indicator in the N reference signal resource indicators, and reporting differential L1-SINR for each reference signal resource indicator in N−1 reference signal resource indicators other than the first reference signal resource indicator in the N reference signal resource indicators relative to a reference SINR,
wherein 4 bits are used for reporting the differential L1-SINR for each reference signal resource indicator in N−1 reference signal resource indicators, with a step size of the differential L1-SINR equal to 1 dB and a mapping method for a reported value of the differential L1-SINR defined as the following table:

| Reported value | Measured quantity value (difference in measured SINR from strongest SINR) | Unit |
| --- | --- | --- |
| DIFFSINR_0 | $0 \geq \Delta SINR > -1$ | dB |
| DIFFSINR_1 | $-1 \geq \Delta SINR > -2$ | dB |
| DIFFSINR_2 | $-2 \geq \Delta SINR > -3$ | dB |
| DIFFSINR_3 | $-3 \geq \Delta SINR > -4$ | dB |
| DIFFSINR_4 | $-4 \geq \Delta SINR > -5$ | dB |
| DIFFSINR_5 | $-5 \geq \Delta SINR > -6$ | dB |
| DIFFSINR_6 | $-6 \geq \Delta SINR > -7$ | dB |

-continued

| Reported value | Measured quantity value (difference in measured SINR from strongest SINR) | Unit |
| --- | --- | --- |
| DIFFSINR_7 | $-7 \geq \Delta\text{SINR} > -8$ | dB |
| DIFFSINR_8 | $-8 \geq \Delta\text{SINR} > -9$ | dB |
| DIFFSINR_9 | $-9 \geq \Delta\text{SINR} > -10$ | dB |
| DIFFSINR_10 | $-10 \geq \Delta\text{SINR} > -11$ | dB |
| DIFFSINR_11 | $-11 \geq \Delta\text{SINR} > -12$ | dB |
| DIFFSINR_12 | $-12 \geq \Delta\text{SINR} > -13$ | dB |
| DIFFSINR_13 | $-13 \geq \Delta\text{SINR} > -14$ | dB |
| DIFFSINR_14 | $-14 \geq \Delta\text{SINR} > -15$ | dB |
| DIFFSINR_15 | $-15 \geq \Delta\text{SINR}$ | dB. |

\* \* \* \* \*